(12) United States Patent
Wong et al.

(10) Patent No.: US 10,156,839 B2
(45) Date of Patent: Dec. 18, 2018

(54) ELECTRONIC DEVICE CONTROL METHOD AND SYSTEM, AND RELATED DEVICE

(71) Applicant: TENCENT TECHNOLOGY (SHENZHEN) COMPANY LIMITED, Shenzhen (CN)

(72) Inventors: Tat Hei Wong, Shenzhen (CN); Jin Fang, Shenzhen (CN); Yi Lu, Shenzhen (CN); Qian Zhang, Shenzhen (CN); Langlang Wu, Shenzhen (CN); Jinsong Jin, Shenzhen (CN); Jun Cheng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 115 days.

(21) Appl. No.: 15/231,499

(22) Filed: Aug. 8, 2016

(65) Prior Publication Data

US 2016/0363923 A1 Dec. 15, 2016

Related U.S. Application Data

(63) Continuation of application No. PCT/CN2015/081928, filed on Jun. 19, 2015.

(30) Foreign Application Priority Data

Jun. 19, 2014 (CN) .......................... 2014 1 0276981

(51) Int. Cl.
*G06F 17/00* (2006.01)
*G05B 19/409* (2006.01)
(Continued)

(52) U.S. Cl.
CPC ......... *G05B 19/409* (2013.01); *G05B 19/042* (2013.01); *H04L 67/125* (2013.01);
(Continued)

(58) Field of Classification Search
CPC .. G06F 3/1454; G06F 3/0481; G06F 3/04886; H04N 21/4126; H04N 21/42207;
(Continued)

(56) References Cited

U.S. PATENT DOCUMENTS 8,892,149 B2 11/2014 Shaffer et al.
2009/0298525 A1 12/2009 Shaffer
(Continued)

FOREIGN PATENT DOCUMENTS

CN 102930705 A 1/2013
CN 103327119 A 9/2013
(Continued)

OTHER PUBLICATIONS

International Search Report in international application No. PCT/CN2015/081928, dated Sep. 25, 2015.
(Continued)

*Primary Examiner* — Thomas Maung
(74) *Attorney, Agent, or Firm* — Anova Law Group, PLLC (57) ABSTRACT

Embodiments of the present invention disclose an electronic device control method and system, and a related device. In the method, a mobile terminal reads an application content identifier included in an application that is stored in an electronic device, outputs the application content identifier included in the application, and outputs, after a first selection operation on an output target application content identifier included in the application is detected, a control option list matching the target application content identifier; and on such a basis, the mobile terminal may detect a second selection operation on any one of content control options included in the control option list, and transmit, by using a wireless link, a content control instruction matching a chosen content control option to the electronic device, so as to
(Continued)

trigger the electronic device to perform, by using the application, a control operation on application content to which the target application content identifier belongs. During implementation of the embodiments of the present invention, application content included in an application can be effectively controlled in a case where an electronic device is far away.

17 Claims, 5 Drawing Sheets

(51) Int. Cl.
    *H04W 4/70*     (2018.01)
    *H04L 29/08*     (2006.01)
    *H04W 12/08*     (2009.01)
    *G05B 19/042*     (2006.01)
    *H05B 37/02*     (2006.01)
    *G06F 3/14*     (2006.01)
    *H04N 21/41*     (2011.01)
    *H04W 88/02*     (2009.01)

(52) U.S. Cl.
    CPC ............ *H04L 67/306* (2013.01); *H04W 4/70* (2018.02); *H04W 12/08* (2013.01); *H05B 37/0272* (2013.01); *G05B 2219/33192* (2013.01); *G06F 3/1454* (2013.01); *H04N 21/4126* (2013.01); *H04W 88/02* (2013.01)

(58) Field of Classification Search
    CPC .......... H04N 21/4222; G09G 2340/145; H04L 67/025
    See application file for complete search history.

(56) References Cited

U.S. PATENT DOCUMENTS

| | | | |
|---|---|---|---|
| 2013/0113738 A1 | 5/2013 | Lee et al. | |
| 2013/0132883 A1* | 5/2013 | Vayrynen | G06F 3/0482 715/773 |
| 2014/0049467 A1* | 2/2014 | Laligand | H04N 21/42207 345/157 |
| 2014/0087714 A1 | 3/2014 | Luo et al. | |
| 2014/0095965 A1 | 4/2014 | Li | |
| 2014/0351733 A1* | 11/2014 | Soheili | H05B 37/0254 715/771 |
| 2015/0045082 A1 | 2/2015 | Shaffer et al. | |
| 2015/0143271 A1* | 5/2015 | Sanders | G06F 3/0481 715/765 |

FOREIGN PATENT DOCUMENTS

| | | |
|---|---|---|
| JP | 2009171229 A | 7/2009 |
| JP | 2011142478 A | 7/2011 |
| JP | 2013214973 A | 10/2013 |

OTHER PUBLICATIONS

English Translation of the Written Opinion of the International Search Authority in international application No. PCT/CN2015/081928, dated Sep. 25, 2015.
Notification of the First Office Action of Japanese application No. 2017-501457, dated Nov. 7, 2017.
English translation of Notification of the First Office Action of Japanese application No. 2017-501457, dated Nov. 7, 2017.

* cited by examiner

ELECTRONIC DEVICE CONTROL METHOD AND SYSTEM, AND RELATED DEVICE

CROSS REFERENCE TO RELATED APPLICATIONS

This is a continuation application of International Patent Application No. PCT/CN2015/081928, filed on Jun. 19, 2015, which claims priority to Chinese Patent Application No. 201410276981.2 filed on Jun. 19, 2014, the disclosure of which is incorporated by reference herein in its entirety.

FIELD OF THE TECHNOLOGY

The present disclosure relates to the field of Internet technologies, and in particular, to an electronic device control method and system, and a related device.

BACKGROUND OF THE DISCLOSURE

Currently, as the performance of commercially available electronic devices (such as a children early learning machine) becomes stronger, more applications, for example, common applications such as e-book applications, jigsaw puzzle applications, speech shadowing applications, course synchronization applications, and children multimedia playback applications, can be installed on the electronic devices. However, it is found in practice that when application content included in an application installed on an electronic device needs to be controlled (for example, to control playback of a nursery rhyme included in a children multimedia playback application), the application content included in the application can be controlled only by performing an operation on the electronic device, and effective control on the application content included in the application cannot be implemented when the electronic device is far away.

SUMMARY

Embodiments of the present invention disclose an electronic device control method and system, and a related device, so that application content included in an application can be effectively controlled in a case where an electronic device is far away.

A first aspect of an embodiment of the present invention discloses an electronic device control method, including:
  reading, by a mobile terminal, an application content identifier included in an application that is stored in an electronic device;
  outputting, by the mobile terminal, the application content identifier included in the application;
  detecting, by the mobile terminal, a first selection operation on an output target application content identifier included in the application;
  responding, by the mobile terminal, to the first selection operation to output a control option list matching the target application content identifier;
  detecting, by the mobile terminal, a second selection operation on any one of content control options included in the control option list; and
  responding, by the mobile terminal, to the second selection operation to transmit a content control instruction matching a chosen content control option to the electronic device, so as to trigger the electronic device to perform, by using the application, a control operation on application content to which the target application content identifier belongs.

A second aspect of an embodiment of the present invention discloses an electronic device control method, including:
  establishing, by an electronic device, a wireless link with a mobile terminal, so that the mobile terminal reads an application content identifier included in an application that is stored in the electronic device; the mobile terminal outputs the application content identifier included in the application; the mobile terminal detects a first selection operation on an output target application content identifier included in the application; the mobile terminal responds to the first selection operation to output a control option list matching the target application content identifier; and the mobile terminal detects a second selection operation on any one of content control options included in the control option list;
  receiving, by the electronic device, a content control instruction matching a chosen content control option transmitted, in response to the second selection operation, by the mobile terminal; and
  responding, by the electronic device, to the content control instruction to perform, by using the application, a control operation on application content to which the target application content identifier belongs.

A third aspect of an embodiment of the present invention discloses a mobile terminal, including:
  a reading unit, configured to read an application content identifier included in an application that is stored in an electronic device;
  an output unit, configured to output the application content identifier included in the application;
  a detection unit, configured to detect a first selection operation on an output target application content identifier included in the application;
  the output unit, further configured to respond to the first selection operation to output a control option list matching the target application content identifier;
  the detection unit, further configured to detect a second selection operation on any one of content control options included in the control option list; and
  a transmission unit, configured to respond to the second selection operation to transmit, by using a wireless link, a content control instruction matching a chosen content control option to the electronic device, so as to trigger the electronic device to perform, by using the application, a control operation on application content to which the target application content identifier belongs.

A fourth aspect of an embodiment of the present invention discloses an electronic device, including:
  a wireless link unit, configured to establish a wireless link between the electronic device and a mobile terminal, so that the mobile terminal reads an application content identifier included in an application that is stored in the electronic device; the mobile terminal outputs the application content identifier included in the application; the mobile terminal detects a first selection operation on an output target application content identifier included in the application; the mobile terminal responds to the first selection operation to output a control option list matching the target application content identifier; and the mobile terminal detects a second selection operation on any one of content control options included in the control option list;

a receiving unit, configured to receive a content control instruction matching a chosen content control option transmitted, in response to the second selection operation, by the mobile terminal; and a control unit, configured to respond to the content control instruction to perform, by using the application, a control operation on application content to which the target application content identifier belongs.

A fifth aspect of an embodiment of the present invention discloses an electronic device control system, including the mobile terminal disclosed in the third aspect of the embodiment of the present invention and the electronic device disclosed in the fourth aspect of the embodiment of the present invention.

In the embodiments of the present invention, a mobile terminal may read an application content identifier included in an application that is stored in an electronic device, output the application content identifier included in the application, and output, after a first selection operation on an output target application content identifier included in the application is detected, a control option list matching the target application content identifier; and on such a basis, the mobile terminal may detect a second selection operation on any one of content control options included in the control option list, and transmit a content control instruction matching a chosen content control option to the electronic device, so as to trigger the electronic device to perform, by using the application, a control operation on application content to which the target application content identifier belongs. Therefore, in the embodiments of the present invention, application content included in an application can be effectively controlled in a case where an electronic device is far away.

BRIEF DESCRIPTION OF THE DRAWINGS

To describe the technical solutions of embodiments of the present invention more clearly, the following briefly introduces the accompanying drawings required in the embodiments. Apparently, the accompanying drawings in the following description show only some embodiments of the present invention, and a person of ordinary skill in the art may still derive other drawings from these accompanying drawings without creative efforts.

DESCRIPTION OF EMBODIMENTS

The following further clearly describes the technical solutions in the embodiments of the present invention in detail with reference to the accompanying drawings. Apparently, the described embodiments are merely a part rather than all of the embodiments of the present invention. All other embodiments obtained by a person of ordinary skill in the art based on the embodiments of the present invention without creative efforts shall fall within the protection scope of the present disclosure.

The embodiments of the present invention disclose an electronic device control method and system, and a related device, so that application content included in an application can be effectively controlled in a case where an electronic device is far away. Separate detailed descriptions are as follows.

Figure 1:
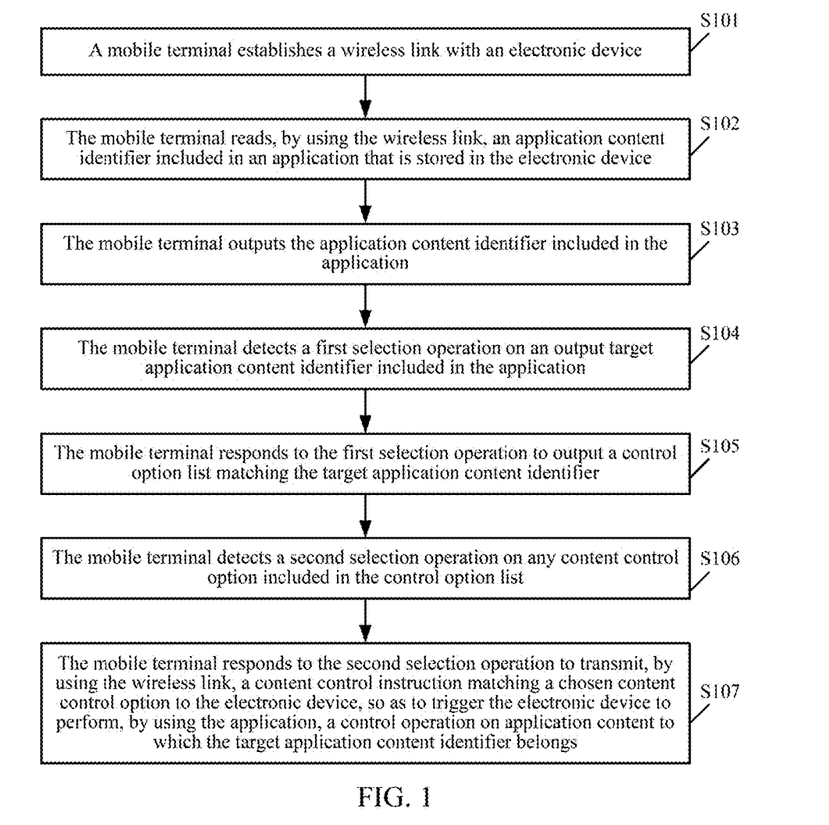
FIG. 1 is a schematic flowchart of an electronic device control method according to an embodiment of the present invention.

Referring to FIG. 1, FIG. 1 is a schematic flowchart of an electronic device control method according to an embodiment of the present invention. As shown in FIG. 1, the method may include the following steps:

S101: A mobile terminal establishes a wireless link with an electronic device.

In this embodiment of the present invention, the mobile terminal may include a mobile terminal such as a mobile phone, a tablet computer, a palmtop computer, and a mobile Internet device (MID), which is not limited in this embodiment of the present invention.

In this embodiment of the present invention, the electronic device may include a children early learning machine, a learning machine, a student tablet computer, and another electronic device installed with an application, which is not limited in this embodiment of the present invention.

In this embodiment of the present invention, the mobile terminal may establish the wireless link with the electronic device in a Bluetooth manner; or when the mobile terminal and the electronic device are located in a same local area network (provided by a Wi-Fi hotspot), the mobile terminal may establish the wireless link with the electronic device in a Wi-Fi manner; or when the mobile terminal and the electronic device are located in different local area networks, the mobile terminal may establish the wireless link with the electronic device by using a cloud server.

S102: The mobile terminal reads, by using the wireless link, an application content identifier included in an application that is stored in the electronic device.

In this embodiment of the present invention, after establishing the wireless link with the electronic device in step S101, the mobile terminal may detect an application content identifier reading instruction input by a user, where the application content identifier instruction is used for instructing the mobile terminal to read the application content identifier included in the application that is stored in the electronic device. Correspondingly, the mobile terminal may respond to the application content identifier reading instruction to send an application content identifier reading request to the electronic device, and receive the application content identifier included in the application sent by the electronic device.

In this embodiment of the present invention, after establishing the wireless link with the electronic device in step S101, the mobile terminal may display identifier information (for example, a name) of the electronic device. In this way, when the user taps the identifier information of the electronic device displayed on the mobile terminal, the mobile terminal can detect the application content identifier reading instruction input by the user.

In this embodiment of the present invention, after establishing the wireless link with the electronic device in step S101, the mobile terminal may also send by default the application content identifier reading request to an electronic device (one or more) wirelessly linked to the mobile terminal, and receive the application content identifier included in the application sent by the electronic device.

S103: The mobile terminal outputs the application content identifier included in the application.

In this embodiment of the present invention, the application content identifier may be a name of application content. For example, if the application content is a nursery rhyme, a video or a game, the application content identifier may be a name of the nursery rhyme, the video or the game; and if the application content is an e-book, the application content identifier may be a chapter sequence number (such as Chapter One and Chapter Two) of the e-book.

S104: The mobile terminal detects a first selection operation on an output target application content identifier included in the application.

In this embodiment of the present invention, the first selection operation may be a tap operation or a double-tap operation.

S105: The mobile terminal responds to the first selection operation to output a control option list matching the target application content identifier.

In this embodiment of the present invention, the control option list matching the target application content identifier may include multiple different content control options. For example, the content control options include a playback option, a pause option, a previous song option, a next song option, a volume up option, and a volume down option or a combination thereof.

S106: The mobile terminal detects a second selection operation on any one of content control options included in the control option list.

In this embodiment of the present invention, the second selection operation may be a tap operation or a double-tap operation.

S107: The mobile terminal responds to the second selection operation to transmit, by using the wireless link, a content control instruction matching a chosen content control option to the electronic device, so as to trigger the electronic device to perform, by using the application, a control operation on application content to which the target application content identifier belongs.

Figure 2:
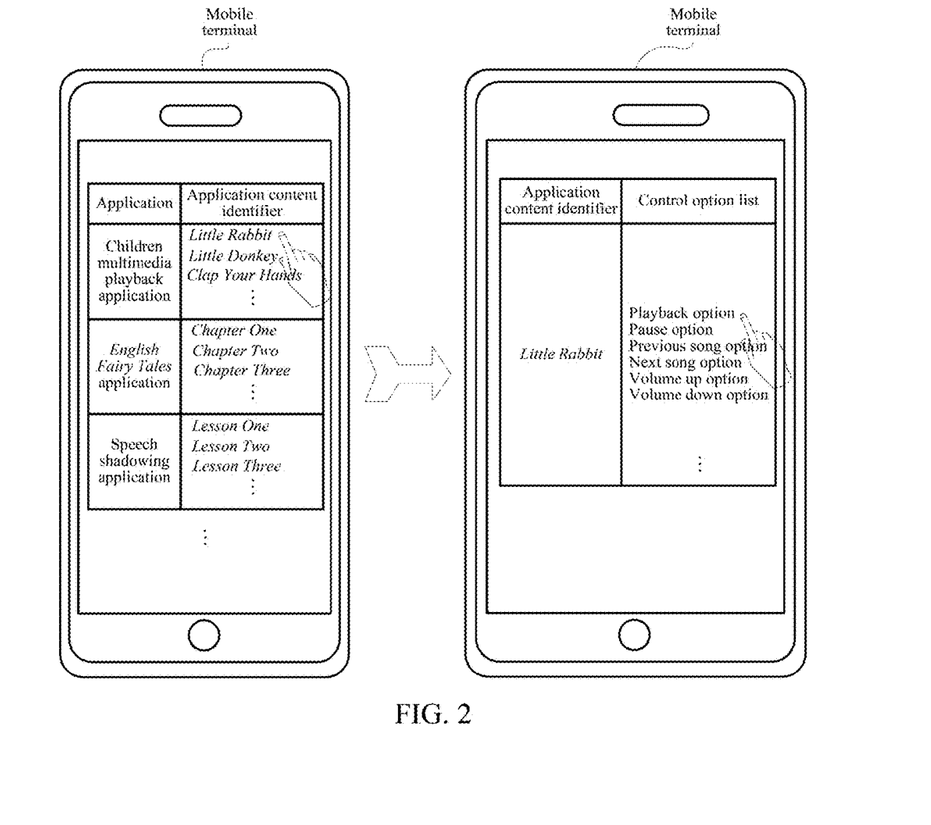
FIG. 2 is a schematic diagram of an interface change of a mobile terminal according to an embodiment of the present invention.

For example, referring to FIG. 2, FIG. 2 is a schematic diagram of an interface change of a mobile terminal according to an embodiment of the present invention. As shown in FIG. 2, it is assumed that the application content identifier included in the application output by the mobile terminal in step S103 may include application content identifiers such as Little Rabbit, Little Donkey, and Clap Your Hands included in a children multimedia playback application, application content identifiers such as Chapter One, Chapter Two, and Chapter Three included in an English Fairy Tales application (an e-book application), and application content identifiers such as Lesson One, Lesson Two, and Lesson Three included in a speech shadowing application. When the mobile terminal detects the first selection operation (that is, a tap operation) on an output target application content identifier Little Rabbit included in the children multimedia playback application in step S104, the mobile terminal may respond to the first selection operation to output a control option list matching the target application content identifier Little Rabbit in step S105. As shown in FIG. 2, the control option list matching the target application content identifier Little Rabbit may include one or more content control options of a playback option, a pause option, a previous song option, a next song option, a volume up option, and a volume down option. When the mobile terminal detects the second selection operation (that is, a tap operation) on a playback control option included in the control option list in step S106, the mobile terminal may respond to the second selection operation to transmit, by using the wireless link, a playback control instruction matching the chosen playback control option to the electronic device, so as to trigger the electronic device to perform, by using the application, a playback operation on application content to which the target application content identifier Little Rabbit belongs in step S107. When the mobile terminal detects the second selection operation (that is, a tap operation) on a volume up control option included in the control option list in step S106, the mobile terminal may respond to the second selection operation to transmit, by using the wireless link, a volume up control instruction matching the chosen volume up control option to the electronic device, so as to trigger the electronic device to perform, by using the application, a volume up operation on the application content to which the target application content identifier Little Rabbit belongs in step S107. The application content to which the target application content identifier Little Rabbit belongs is song content to which the target application content identifier Little Rabbit belongs.

In this embodiment of the present invention, the control option list matching the target application content identifier may further include light effect control options, where the light effect control options may include a breathing light effect control option, a twinkling light effect control option, a gradient light effect control option, and a revolving light effect control option or a combination thereof. Correspondingly, the method described in FIG. 1 may further include the following steps:

Step 11): The mobile terminal detects a third selection operation on any one of light effect control options included in the control option list.

In this embodiment of the present invention, the third selection operation may be a tap operation or a double-tap operation.

Step 12): The mobile terminal responds to the third selection operation to transmit, by using the wireless link, a light effect control instruction matching a chosen light effect control option to the electronic device, so as to trigger the electronic device to control a light effect output by the application.

Figure 3:
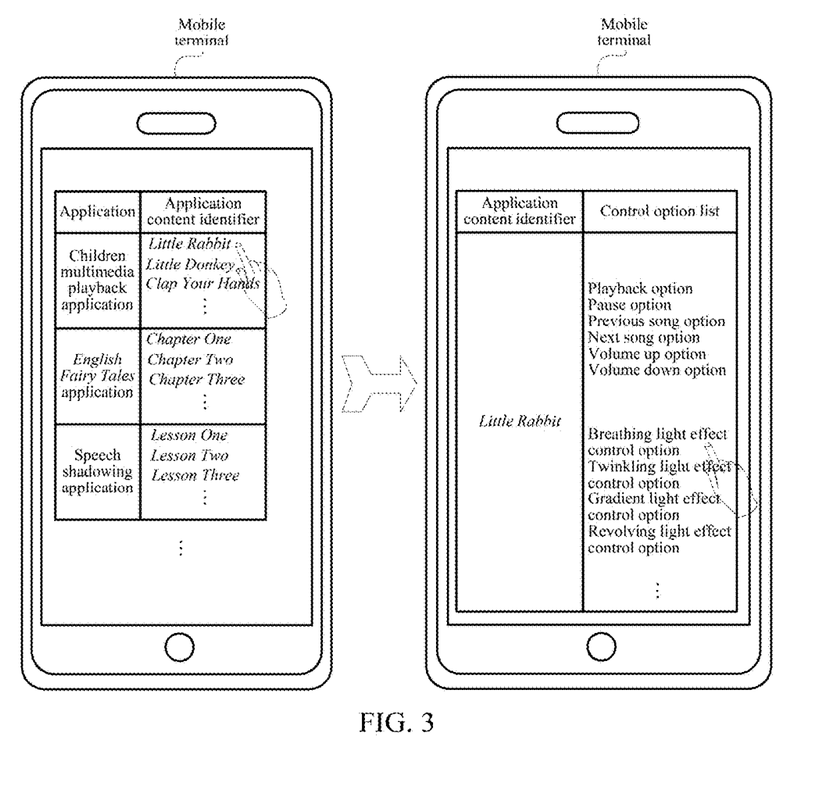
FIG. 3 is a schematic diagram of another interface change of a mobile terminal according to an embodiment of the present invention.

For example, referring to FIG. 3, FIG. 3 is a schematic diagram of another interface change of a mobile terminal according to an embodiment of the present invention. As shown in FIG. 3, it is assumed that the application content identifier included in the application output by the mobile terminal in step S103 may include application content identifiers such as Little Rabbit, Little Donkey, and Clap Your Hands included in a children multimedia playback application, application content identifiers such as Chapter One, Chapter Two, and Chapter Three included in an English Fairy Tales application (an e-book application), and application content identifiers such as Lesson One, Lesson Two, and Lesson Three included in a speech shadowing application. When the mobile terminal detects the first selection operation (that is, a tap operation) on an output target application content identifier Little Rabbit included in the children multimedia playback application in step S104, the mobile terminal may respond to the first selection operation to output a control option list matching the target application content identifier Little Rabbit in step S105. As shown in FIG. 3, the control option list matching the target application content identifier Little Rabbit further includes, in addition to one or more content control options of a playback option, a pause option, a previous song option, a next song option, a volume up option, and a volume down option, one or more light effect control options of a breathing light effect control option, a twinkling light effect control option, a gradient light effect control option, and a revolving light effect control option. When the mobile terminal detects the second selection operation (that is, a tap operation) on a playback control option included in the control option list in step S106, the mobile terminal may respond to the second selection operation to transmit, by using the wireless link, a playback control instruction matching the chosen playback control option to the electronic device, so as to trigger the electronic device to perform, by using the application, a playback operation on application content to which the target application content identifier Little Rabbit belongs in step S107. Further, when the mobile terminal detects the third selection operation (that is, a tap operation) on the breathing light effect control option included in the control option list, the mobile terminal may respond to the third selection operation to transmit, by using the wireless link, a breathing light effect control instruction matching the chosen breathing light effect control option to the electronic device, so as to trigger the electronic device to control a breathing light effect output by the application, thereby implementing light effect control on the application and improving learning attraction of the application.

In this embodiment of the present invention, in the method described in FIG. 1, after establishing the wireless link with the electronic device, the mobile terminal may further transmit media content to the electronic device by using the wireless link for storage or output, where the media content includes audio (including speech), a video, text, and an emoticon or a combination thereof, which is not limited in this embodiment of the present invention.

In the method described in FIG. 1, a mobile terminal may read, by using a wireless link, an application content identifier included in an application that is stored in an electronic device, output the application content identifier included in the application, and output, after a first selection operation on an output target application content identifier included in the application is detected, a control option list matching the target application content identifier; and on such a basis, the mobile terminal may detect a second selection operation on any one of content control options included in the control option list, and transmit a content control instruction matching a chosen content control option to the electronic device by using the wireless link, so as to trigger the electronic device to perform, by using the application, a control operation on application content to which the target application content identifier belongs. Therefore, in the method described in FIG. 1, application content included in an application can be effectively controlled in a case where an electronic device is far away.

Figure 4:
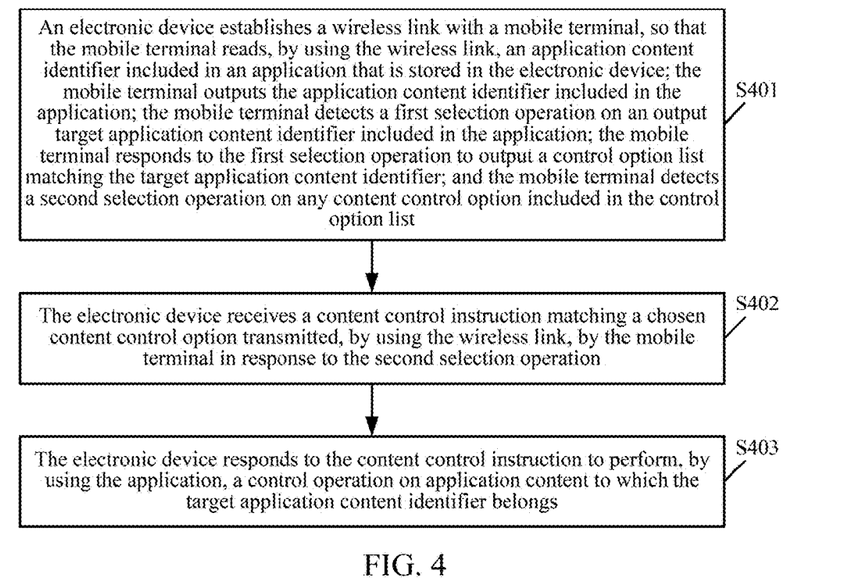
FIG. 4 is a schematic flowchart of another electronic device control method according to an embodiment of the present invention.

Referring to FIG. 4, FIG. 4 is a schematic flowchart of another electronic device control method according to an embodiment of the present invention. As shown in FIG. 4, the method may include the following steps:

S401: An electronic device establishes a wireless link with a mobile terminal, so that the mobile terminal reads, by using the wireless link, an application content identifier included in an application that is stored in the electronic device; the mobile terminal outputs the application content identifier included in the application; the mobile terminal detects a first selection operation on an output target application content identifier included in the application; the mobile terminal responds to the first selection operation to output a control option list matching the target application content identifier; and the mobile terminal detects a second selection operation on any one of content control options included in the control option list.

In this embodiment of the present invention, the application content identifier may be a name of application content. For example, if the application content is a nursery rhyme, a video or a game, the application content identifier may be a name of the nursery rhyme, the video or the game; and if the application content is an e-book, the application content identifier may be a chapter sequence number (such as Chapter One and Chapter Two) of the e-book.

In this embodiment of the present invention, the content control options may include a playback option, a pause option, a previous song option, a next song option, a volume up option, and a volume down option or a combination thereof.

In this embodiment of the present invention, the first selection operation may be a tap operation or a double-tap operation.

In this embodiment of the present invention, the second selection operation may be a tap operation or a double-tap operation.

S402: The electronic device receives a content control instruction matching a chosen content control option transmitted, by using the wireless link, by the mobile terminal in response to the second selection operation.

S403: The electronic device responds to the content control instruction to perform, by using the application, a control operation on application content to which the target application content identifier belongs.

For example, when a content control instruction received by the electronic device in step S402 is a playback control instruction of application content to which a target application content identifier Little Rabbit belongs, the electronic device may perform a playback operation on the application content to which the target application content identifier Little Rabbit belongs by using a children multimedia playback application.

In this embodiment of the present invention, the control option list matching the target application content identifier may further include light effect control options, where the light effect control options may include a breathing light effect control option, a twinkling light effect control option, a gradient light effect control option, and a revolving light effect control option or a combination thereof. Correspondingly, the mobile terminal may detect a third selection operation on any one of light effect control options included in the control option list. Correspondingly, the method described in FIG. 4 may further include the following steps:

Step 41): The electronic device receives a light effect control instruction matching a chosen light effect control option transmitted, by using the wireless link, by the mobile terminal in response to the third selection operation.

In this embodiment of the present invention, the third selection operation may be a tap operation or a double-tap operation.

Step 42): The electronic device responds to the light effect control instruction to control a light effect output by the application.

For example, when a light effect control instruction received by the electronic device in step 41) is a breathing light effect control instruction, the electronic device may respond to the breathing light effect control instruction to control a breathing light effect output by the application. The breathing light effect control instruction may include identifier information of the application, such as a name.

In this embodiment of the present invention, after establishing the wireless link with the mobile terminal, the electronic device may receive media content transmitted, by using the wireless link, by the mobile terminal for storage or output, where the media content includes audio (including speech), a video, text, and an emoticon or a combination thereof.

In the method described in the FIG. 4, an electronic device can be controlled by a mobile terminal that is far away from the electronic device, and effective control on application content included in an application can be implemented.

Figure 5:
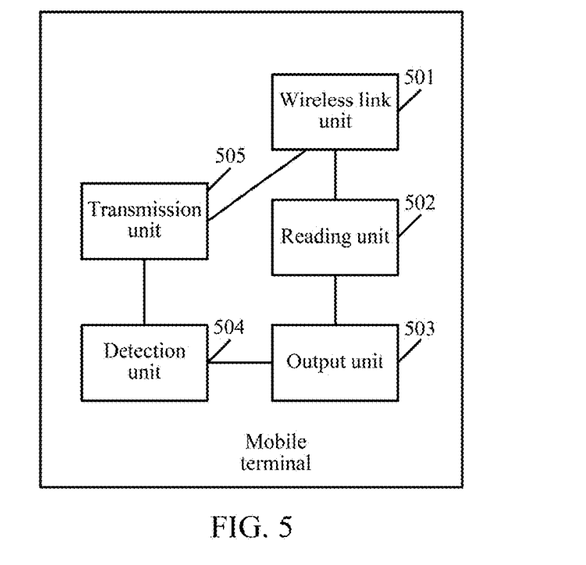
FIG. 5 is a schematic structural diagram of a mobile terminal according to an embodiment of the present invention.

Referring to FIG. 5, FIG. 5 is a schematic structural diagram of a mobile terminal according to an embodiment of the present invention. As shown in FIG. 5, the mobile terminal may include:

A wireless link unit 501 is configured to establish a wireless link between the mobile terminal and an electronic device, where the wireless link may be a Bluetooth wireless link, a Wi-Fi wireless link or the like.

A reading unit 502 is configured to read, by using the wireless link, an application content identifier included in an application that is stored in the electronic device.

In this embodiment of the present invention, the application content identifier may be a name of application content. For example, if the application content is a nursery rhyme, a video or a game, the application content identifier may be a name of the nursery rhyme, the video or the game; and if the application content is an e-book, the application content identifier may be a chapter sequence number (such as Chapter One and Chapter Two) of the e-book.

An output unit 503 is configured to output the application content identifier included in the application.

A detection unit 504 is configured to detect a first selection operation on an output target application content identifier included in the application.

In this embodiment of the present invention, the first selection operation may be a tap operation or a double-tap operation.

The output unit 503 is further configured to respond to the first selection operation to output a control option list matching the target application content identifier.

The detection unit 504 is further configured to detect a second selection operation on any one of content control options included in the control option list.

In this embodiment of the present invention, the second selection operation may be a tap operation or a double-tap operation.

In this embodiment of the present invention, the content control options may include a playback option, a pause option, a previous song option, a next song option, a volume up option, and a volume down option or a combination thereof.

A transmission unit 505 is configured to respond to the second selection operation to transmit, by using the wireless link, a content control instruction matching a chosen content control option to the electronic device, so as to trigger the electronic device to perform, by using the application, a control operation on application content to which the target application content identifier belongs.

In this embodiment of the present invention, the control option list may further include light effect control options, where the light effect control options may include a breathing light effect control option, a twinkling light effect control option, a gradient light effect control option, and a revolving light effect control option or a combination thereof.

Correspondingly, the detection unit 504 is further configured to detect a third selection operation on any one of light effect control options included in the control option list, where the third selection operation may be a tap operation or a double-tap operation.

Correspondingly, the transmission unit 505 is further configured to respond to the third selection operation to transmit, by using the wireless link, a light effect control instruction matching a chosen light effect control option to the electronic device, so as to trigger the electronic device to control a light effect output by the application.

For example, when the light effect control option is the breathing light effect control option, the transmission unit 505 may transmit a breathing light effect control instruction to the electronic device, so as to trigger the electronic device to control a breathing light effect output by the application. The breathing light effect control instruction may include identifier information of the application, such as a name.

In this embodiment of the present invention, the transmission unit 505 is further configured to transmit media content to the electronic device by using the wireless link, where the media content includes audio (including speech), a video, text, and an emoticon or a combination thereof.

Therefore, application content included in an application can be effectively controlled in a case where an electronic device is far away by means of the implementation of the mobile terminal described in FIG. 5.

Figure 6:
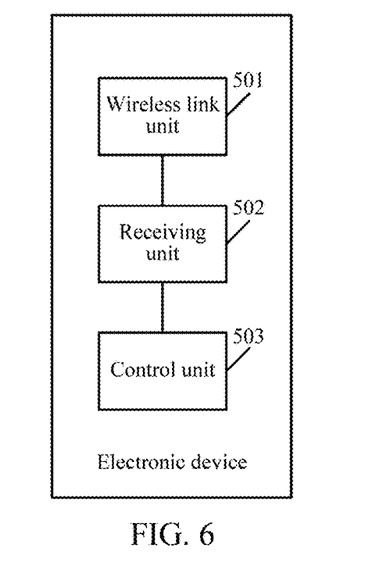
FIG. 6 is a schematic structural diagram of an electronic device according to an embodiment of the present invention.

Referring to FIG. 6, FIG. 6 is a schematic structural diagram of an electronic device according to an embodiment of the present invention. As shown in FIG. 6, the electronic device may include:

A wireless link unit 601 is configured to establish a wireless link between the electronic device and a mobile terminal, so that the mobile terminal reads, by using the wireless link, an application content identifier included in an application that is stored in the electronic device; the mobile terminal outputs the application content identifier included in the application; the mobile terminal detects a first selection operation on an output target application content identifier included in the application; the mobile terminal responds to the first selection operation to output a control option list matching the target application content identifier; and the mobile terminal detects a second selection operation on any one of content control options included in the control option list.

In this embodiment of the present invention, the application content identifier may be a name of application content. For example, if the application content is a nursery rhyme, a video or a game, the application content identifier may be a name of the nursery rhyme, the video or the game; and if the application content is an e-book, the application content identifier may be a chapter sequence number (such as Chapter One and Chapter Two) of the e-book.

In this embodiment of the present invention, the content control options may include a playback option, a pause option, a previous song option, a next song option, a volume up option, and a volume down option or a combination thereof.

In this embodiment of the present invention, the first selection operation may be a tap operation or a double-tap operation.

In this embodiment of the present invention, the second selection operation may be a tap operation or a double-tap operation.

A receiving unit 602 is configured to receive a content control instruction matching a chosen content control option transmitted, by using the wireless link, by the mobile terminal in response to the second selection operation.

A control unit 603 is configured to respond to the content control instruction to perform, by using the application, a control operation on application content to which the target application content identifier belongs.

For example, when a content control instruction received by the receiving unit 602 is a playback control instruction of application content to which a target application content identifier Little Rabbit belongs, the control unit 603 may perform, by using a children multimedia playback application, a playback operation on the application content to which the target application content identifier Little Rabbit belongs.

In this embodiment of the present invention, the control option list matching the target application content identifier may further include light effect control options, where the light effect control options may include a breathing light effect control option, a twinkling light effect control option, a gradient light effect control option, and a revolving light effect control option or a combination thereof. Correspondingly, the mobile terminal may detect a third selection operation on any one of light effect control options included in the control option list; correspondingly, the receiving unit 602 is further configured to receive a light effect control instruction matching a chosen light effect control option transmitted, by using the wireless link, by the mobile terminal in response to the third selection operation; and correspondingly, the control unit 603 is further configured to respond to the light effect control instruction to control a light effect output by the application.

For example, when a light effect control instruction received by the receiving unit 602 is a breathing light effect control instruction, the control unit 603 may respond to the breathing light effect control instruction to control a breathing light effect output by the application. The breathing light effect control instruction may include identifier information of the application, such as a name.

In this embodiment of the present invention, after the wireless link unit 601 establishes the wireless link between the electronic device and the mobile terminal, the receiving unit 602 may further receive media content transmitted, by using the wireless link, by the mobile terminal for storage or output, where the media content includes audio (including speech), a video, text, and an emoticon or a combination thereof.

In the electronic device described in FIG. 6, the electronic device can be controlled by a mobile terminal that is far away from the electronic device, and effective control on application content included in an application can be implemented.

Figure 7:
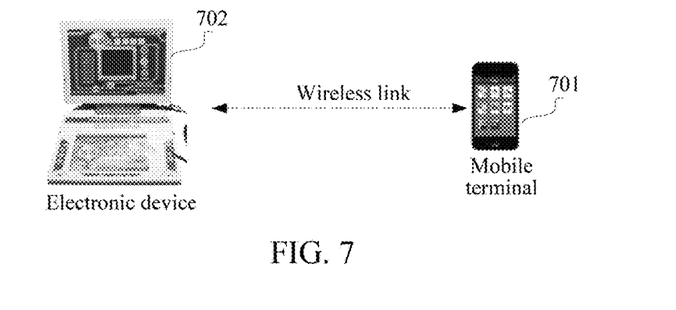
FIG. 7 is a schematic structural diagram of an electronic device control system according to an embodiment of the present invention.

Referring to FIG. 7, FIG. 7 is a schematic structural diagram of an electronic device control system according to an embodiment of the present invention. The system may include a mobile terminal 701 and an electronic device 702 that is wirelessly linked to the mobile terminal 701, where the structure and functions of the mobile terminal 701 are the same as those of the mobile terminal described in FIG. 5; and the structure and functions of the electronic device 702 are the same as those of the electronic device described in FIG. 6, which are not described again in this embodiment of the present invention.

In the system described in FIG. 7, a mobile terminal can effectively control application content included in an application in a case where an electronic device is far away.

In this embodiment of the present invention, the content control instruction may include identifier information of the application and identifier information of the application content.

A person of ordinary skill in the art may understand that all or some of the steps in methods of the foregoing embodiments may be implemented by a program instructing relevant hardware. The program may be stored in a computer readable storage medium. The storage medium may include: a flash disk, a read-only memory (ROM), a random access memory (RAM), a magnetic disk, an optical disc or the like.

The following describes an electronic device control method and system, and a related device disclosed in the embodiments of the present invention in detail. Specific examples are used herein to explain principles and implementation manners of the present disclosure, and description of the following embodiments is only used to help understand the method of the present disclosure and core concept thereof. Meanwhile, a person of ordinary skill in the art may make variations in specific implementation manners and the application scope according to the conception of the present disclosure. In summary, content of the present description should not be understood as a limitation to the present disclosure.

What is claimed is:

1. An electronic device control method, comprising:
reading, by a mobile terminal, a plurality of application content identifiers comprised in an application that is stored in an electronic device, wherein the electronic device is a learning machine that stores multiple applications, the multiple applications include at least two of an e-book application, a children multimedia application, or a speech shadowing application, and each of the multiple applications includes multiple corresponding application content identifiers;
simultaneously displaying, by the mobile terminal, names of the multiple applications stored on the electronic device and the multiple corresponding application content identifiers indicating contents stored on the electronic device, including:
displaying, for each of the multiple applications, the plurality of application content identifiers at a location associated with a displaying location of a name of the application on a graphical user interface of the mobile terminal;
when the application is the e-book application, displaying chapter sequence numbers as the plurality of application content identifiers;
when the application is the children multimedia application, displaying names of a plurality of media pieces as the plurality of application content identifiers; and
when the application is the speech shadowing application, displaying lesson numbers as the plurality of application content identifiers,
wherein at least two of the chapter sequence numbers, names of the plurality of media pieces, or the lesson numbers are simultaneously displayed on the same graphical user interface on the mobile terminal;
detecting, by the mobile terminal, a first selection operation on a target application content identifier among the plurality of displayed application content identifiers comprised in the application;
responding, by the mobile terminal, to the first selection operation by displaying a control option list matching the target application content identifier;
detecting, by the mobile terminal, a second selection operation on any one of content control options comprised in the control option list; and responding, by the mobile terminal, to the second selection operation by transmitting a content control instruction matching a chosen content control option to the electronic device, so as to trigger the electronic device to perform, by using the application, a control operation on application content to which the target application content identifier belongs, wherein the control option list further comprises light effect control options including: a breathing light effect control option, a twinkling light effect control option, a gradient light effect control option, and a revolving light effect control option or a combination thereof.

2. The method according to claim 1, wherein before the reading, by a mobile terminal, a plurality of application content identifiers comprised in an application that is stored in an electronic device, the method further comprises:

establishing, by the mobile terminal, a wireless link with the electronic device.

3. The method according to claim 2, wherein the method further comprises:

detecting, by the mobile terminal, a third selection operation on any one of light effect control options comprised in the control option list; and responding, by the mobile terminal, to the third selection operation to transmit a light effect control instruction matching a chosen light effect control option to the electronic device, so as to trigger the electronic device to control a light effect output by the application.

4. The method according to claim 1, wherein the content control options comprise a playback option, a pause option, a previous song option, a next song option, a volume up option, and a volume down option or a combination thereof.

5. The method according to claim 1, wherein the method further comprises:

transmitting, by the mobile terminal, media content to the electronic device, wherein the media content comprises audio, a video, text, and an emoticon or a combination thereof.

6. An electronic device control method, comprising:

establishing, by an electronic device, a wireless link with a mobile terminal, wherein the electronic device is a learning machine that stores multiple applications, the multiple applications include at least two of an e-book application, a children multimedia application, or a speech shadowing application, and each of the multiple applications includes multiple corresponding application content identifiers;

sending, by the electronic device, a plurality of names of the multiple applications stored on the electronic device and the multiple corresponding application content identifiers indicating contents stored on the electronic device so that the mobile terminal reads and displays a plurality of application content identifiers comprised in an application that is stored in the electronic device, including:

when the application is the e-book application, sending chapter sequence numbers as the plurality of application content identifiers being displayed on a graphical user interface of the mobile terminal;

when the application is the children multimedia application, sending names of a plurality of media pieces as the plurality of application content identifiers being displayed on the same graphical user interface of the mobile terminal; and when the application is the speech shadowing application, sending lesson numbers as the plurality of application content identifiers being displayed on the same graphical user interface of the mobile terminal, wherein the mobile terminal detects a first selection operation on a target application content identifier among the plurality of application content identifiers comprised in the application displayed on the same graphical user interface of the mobile terminal; the mobile terminal responds to the first selection operation by displaying a control option list matching the target application content identifier; and the mobile terminal detects a second selection operation on any one of content control options comprised in the control option list;

receiving, by the electronic device, a content control instruction matching a chosen content control option transmitted, in response to the second selection operation, by the mobile terminal; and responding, by the electronic device, to the content control instruction to perform, by using the application, a control operation on application content to which the target application content identifier belongs, wherein the control option list further comprises light effect control options including: a breathing light effect control option, a twinkling light effect control option, a gradient light effect control option, and a revolving light effect control option or a combination thereof.

7. The method according to claim 6, wherein the mobile terminal detects a third selection operation on any one of light effect control options comprised in the control option list; and the method further comprises:

receiving, by the electronic device, a light effect control instruction matching a chosen light effect control option transmitted, by using the wireless link, by the mobile terminal in response to the third selection operation; and responding, by the electronic device, to the light effect control instruction to control a light effect output by the application.

8. The method according to claim 6, wherein the content control options comprise a playback option, a pause option, a previous song option, a next song option, a volume up option, and a volume down option or a combination thereof.

9. The method according to claim 6, wherein the method further comprises:

receiving, by the electronic device, media content transmitted by the mobile terminal, wherein the media content comprises audio, a video, text, and an emoticon or a combination thereof.

10. A mobile terminal, comprising:

a first memory that stores first computer-executable programs, wherein when executing the first programs, the mobile terminal is configured to:

read a plurality of application content identifiers comprised in an application that is stored in an electronic device, wherein the electronic device is a learning machine that stores multiple applications, the multiple applications include at least two of an e-book application, a children multimedia application, or a speech shadowing application, and each of the multiple applications includes multiple corresponding application content identifiers;

simultaneously display names of the multiple applications stored on the electronic device and the multiple corresponding application content identifiers indicating contents stored on the electronic device, including:

displaying, for each of the multiple applications, the plurality of application content identifiers at a location associated with a displaying location of a name of the application on a graphical user interface of the mobile terminal;

when the application is the e-book application, displaying chapter sequence numbers as the plurality of application content identifiers, when the application is the children multimedia application, displaying names of a plurality of media pieces as the plurality of application content identifiers; and when the application is the speech shadowing application, displaying lesson numbers as the plurality of application content identifiers;

wherein at least two of the chapter sequence numbers, names of the plurality of media pieces, or the lesson numbers are simultaneously displayed on the same graphical user interface on the mobile terminal;

detect a first selection operation on a target application content identifier among the plurality of displayed application content identifiers comprised in the application;

the output unit, further configured to respond to the first selection operation by displaying a control option list matching the target application content identifier;

the detection unit, further configured to detect a second selection operation on any one of content control options comprised in the control option list; and a transmission unit, configured to respond to the second selection operation by transmitting, by using a wireless link, a content control instruction matching a chosen content control option to the electronic device, so as to trigger the electronic device to perform, by using the application, a control operation on application content to which the target application content identifier belongs;

wherein the control option list further comprises light effect control options including: a breathing light effect control option, a twinkling light effect control option, a gradient light effect control option, and a revolving light effect control option or a combination thereof.

11. The mobile terminal according to claim 10, wherein the mobile terminal is further configured to establish a wireless link between the mobile terminal and the electronic device before reading the plurality of application content identifiers comprised in the application that is stored in the electronic device.

12. The mobile terminal according to claim 11, wherein the mobile terminal is further configured to:

detect a third selection operation on any one of light effect control options comprised in the control option list; and respond to the third selection operation to transmit a light effect control instruction matching a chosen light effect control option to the electronic device, so as to trigger the electronic device to control a light effect output by the application.

13. The mobile terminal according to claim 11, wherein the content control options comprise a playback option, a pause option, a previous song option, a next song option, a volume up option, and a volume down option or a combination thereof.

14. The mobile terminal according to claim 11, wherein the mobile terminal is further configured to transmit media content to the electronic device, wherein the media content comprises audio, a video, text, and an emoticon or a combination thereof.

15. An electronic device, comprising:

a memory that stores computer-executable programs, wherein when executing the programs, the electronic device is configured to:

establish a wireless link between the electronic device and a mobile terminal, wherein the electronic device is a learning machine that stores multiple applications, the multiple applications include at least two of an e-book application, a children multimedia application, or a speech shadowing application, and each of the multiple applications includes multiple corresponding application content identifiers;

send a plurality of names of the multiple applications stored on the electronic device and the multiple corresponding application content identifiers indicating contents stored on the electronic device so that the mobile terminal reads and displays a plurality of application content identifiers comprised in an application that is stored in the electronic device, including:

when the application is the e-book application, sending chapter sequence numbers as the plurality of application content identifiers being displayed on a graphical user interface of the mobile terminal;

when the application is the children multimedia application, sending names of a plurality of media pieces as the plurality of application content identifiers being displayed on the same graphical user interface of the mobile terminal; and when the application is the speech shadowing application, sending lesson numbers as the plurality of application content identifiers being displayed on the same graphical user interface of the mobile terminal, wherein the mobile terminal detects a first selection operation on a target application content identifier among the plurality of application content identifiers comprised in the application displayed on the same graphical user interface of the mobile terminal; the mobile terminal responds to the first selection operation by displaying a control option list matching the target application content identifier; and the mobile terminal detects a second selection operation on any one of content control options comprised in the control option list;

receive a content control instruction matching a chosen content control option transmitted, in response to the second selection operation, by the mobile terminal; and respond to the content control instruction to perform, by using the application, a control operation on application content to which the target application content identifier belongs, wherein the control option list further comprises light effect control options including: a breathing light effect control option, a twinkling light effect control option, a gradient light effect control option, and a revolving light effect control option or a combination thereof.

16. The electronic device according to claim 15, wherein the mobile terminal detects a third selection operation on any one of light effect control options comprised in the control option list; the electronic device is further configured to receive a light effect control instruction matching a chosen light effect control option transmitted, in response to the third selection operation, by the mobile terminal; and respond to the light effect control instruction to control a light effect output by the application, wherein the content control options comprise a playback option, a pause option, a previous song option, a next song option, a volume up option, and a volume down option or a combination thereof, wherein the electronic device is further configured to receive media content transmitted, by using the wireless link, by the mobile terminal, wherein the media content comprises audio, a video, text, and an emoticon or a combination thereof.

17. An electronic device control system, comprising the mobile terminal according to claim 10 and an electronic device, wherein the electronic device comprises:

a second memory that stores second computer-executable programs, wherein when executing the second programs, the electronic device is configured to:

establish a wireless link between the electronic device and a mobile terminal, so that the mobile terminal reads the plurality of application content identifiers comprised in an application that is stored in the electronic device, including:

when the application is the e-book application, sending chapter sequence numbers as the plurality of application content identifiers being displayed on the mobile terminal;

when the application is the children multimedia application, sending names of a plurality of media pieces as the plurality of application content identifiers being displayed on the mobile terminal; and when the application is the speech shadowing application, displaying lesson numbers as the plurality of application content identifiers being displayed on the mobile terminal;

receive a content control instruction matching a chosen content control option transmitted, in response to the second selection operation, by the mobile terminal; and respond to the content control instruction to perform, by using the application, a control operation on application content to which the target application content identifier belongs.

* * * * *